( 12 ) United States Patent
Al-Khairy

(10) Patent No.: US 11,946,811 B2
(45) Date of Patent: Apr. 2, 2024

(54) NON-CONTACT HIGH TEMPERATURE MEASUREMENT SYSTEM

(71) Applicant: Pratt & Whitney Canada Corp., Longueuil (CA)

(72) Inventor: Issam Al-Khairy, Verdun (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/401,864

(22) Filed: Aug. 13, 2021

(65) Prior Publication Data

US 2023/0052824 A1 Feb. 16, 2023

(51) Int. Cl.
*G01J 5/00* (2022.01)
*F02C 7/00* (2006.01)
*G01J 5/0821* (2022.01)

(52) U.S. Cl.
CPC .............. *G01J 5/0088* (2013.01); *F02C 7/00* (2013.01); *G01J 5/0821* (2013.01); *F05D 2270/804* (2013.01)

(58) Field of Classification Search
CPC .................. G01J 5/0088; G01J 5/0014; F05D 2270/8041; F05D 2270/804; F02C 7/00
See application file for complete search history.

(56) References Cited

U.S. PATENT DOCUMENTS

| | | | |
|---|---|---|---|
| 3,626,758 A | | 12/1971 | Stewart |
| 4,576,486 A | * | 3/1986 | Dils ...................... G01J 5/0802 250/339.04 |
| 4,770,544 A | * | 9/1988 | Mossey .................... G01J 5/061 374/131 |
| 4,942,294 A | * | 7/1990 | Witte ..................... G01D 5/268 250/226 |
| 5,078,507 A | * | 1/1992 | Koller ...................... G01J 5/08 374/208 |
| 5,149,962 A | * | 9/1992 | Maurice ................... G01V 3/08 324/207.13 |
| 5,214,377 A | * | 5/1993 | Maurice ................... G01V 3/08 250/225 |
| 5,277,496 A | * | 1/1994 | Mayer ................... G01J 5/0821 374/208 |
| 5,364,186 A | * | 11/1994 | Wang ................. G01J 5/08021 374/126 |
| 5,499,497 A | * | 3/1996 | DeFreitas ............... F23N 5/082 60/776 |

(Continued)

FOREIGN PATENT DOCUMENTS

CN 209689779 U * 11/2019
DE 102021214839 A1 * 9/2022

(Continued)

OTHER PUBLICATIONS

EP search report for EP22190414.7 dated Jan. 18, 2023.

*Primary Examiner* — Craig Kim
(74) *Attorney, Agent, or Firm* — Getz Balich LLC

(57) ABSTRACT

An assembly is provided for a turbine engine. This turbine engine assembly includes a turbine engine structure and a sensor system. The sensor system includes a probe and an optical sensor. The probe is connected to the turbine engine structure. The probe projects into a gas path of the turbine engine. The sensor system is configured to measure a temperature of the probe using the optical sensor.

20 Claims, 6 Drawing Sheets

(56) References Cited

U.S. PATENT DOCUMENTS

| | | | | |
|---|---|---|---|---|
| 5,670,784 A * | 9/1997 | Cusack | | G01J 5/0014 |
| | | | | 250/370.01 |
| 5,763,888 A * | 6/1998 | Glasheen | | G01J 5/0014 |
| | | | | 250/554 |
| 5,828,797 A * | 10/1998 | Minott | | F01D 21/003 |
| | | | | 385/115 |
| 6,341,890 B1 | 1/2002 | Vally | | |
| 6,599,028 B1 * | 7/2003 | Shu | | F23D 14/82 |
| | | | | 385/139 |
| 6,647,350 B1 * | 11/2003 | Palfenier | | G01J 5/0806 |
| | | | | 374/E11.003 |
| 6,816,803 B1 * | 11/2004 | Palfenier | | G01J 5/0821 |
| | | | | 374/E11.003 |
| 8,371,102 B1 * | 2/2013 | Lee | | F02C 9/28 |
| | | | | 356/939 |
| 8,456,634 B2 * | 6/2013 | McManus | | F23N 5/082 |
| | | | | 60/773 |
| 9,182,285 B2 * | 11/2015 | Lemieux | | G02B 23/2476 |
| 9,423,317 B2 | 8/2016 | Frost | | |
| 9,587,834 B2 | 3/2017 | Desilva | | |
| 9,773,584 B2 * | 9/2017 | Hazelton | | H01B 13/0036 |
| 10,392,959 B2 * | 8/2019 | Olechnowicz | | G01J 5/0088 |
| 10,533,901 B2 * | 1/2020 | Wang | | G01K 1/14 |
| 11,041,446 B2 | 6/2021 | Graham | | |
| 11,359,939 B2 * | 6/2022 | Grobnic | | G02B 6/124 |
| 11,397,112 B2 * | 7/2022 | Wang | | G05B 13/00 |
| 11,485,543 B2 * | 11/2022 | Ramm | | C23C 14/08 |
| 2004/0179575 A1 * | 9/2004 | Markham | | G01J 5/0022 |
| | | | | 374/121 |
| 2007/0133921 A1 * | 6/2007 | Haffner | | B82Y 20/00 |
| | | | | 250/231.19 |
| 2009/0056335 A1 * | 3/2009 | Myers | | F02C 9/263 |
| | | | | 60/737 |
| 2011/0069165 A1 * | 3/2011 | Zombo | | F01D 21/003 |
| | | | | 348/82 |
| 2012/0032810 A1 * | 2/2012 | Chillar | | G01J 5/0802 |
| | | | | 374/4 |
| 2012/0171015 A1 * | 7/2012 | DeLancey | | F01D 17/02 |
| | | | | 415/118 |
| 2013/0194411 A1 * | 8/2013 | Baleine | | G03B 17/55 |
| | | | | 348/82 |
| 2014/0376588 A1 * | 12/2014 | Wang | | G01J 5/602 |
| | | | | 374/121 |
| 2014/0376590 A1 * | 12/2014 | Hwang | | G01M 15/14 |
| | | | | 29/428 |
| 2017/0234734 A1 * | 8/2017 | Sakami | | G02B 7/028 |
| | | | | 359/820 |
| 2017/0234772 A1 | 8/2017 | Nirmalan | | |
| 2018/0038736 A1 | 2/2018 | Kocer | | |
| 2018/0073387 A1 * | 3/2018 | Kestering | | G01P 3/36 |
| 2018/0348070 A1 * | 12/2018 | Wang | | G01K 1/14 |
| 2019/0277770 A1 * | 9/2019 | Mekala | | G01N 21/954 |
| 2020/0023856 A1 * | 1/2020 | Kim | | G10L 17/00 |
| 2020/0049564 A1 * | 2/2020 | McLaren | | G01J 5/026 |
| 2021/0404348 A1 * | 12/2021 | Buonvino | | F02C 9/18 |
| 2022/0228923 A1 * | 7/2022 | Knobloch | | G01N 21/3504 |
| 2022/0299395 A1 * | 9/2022 | Ponyavin | | F02D 41/22 |

FOREIGN PATENT DOCUMENTS

| | | | | |
|---|---|---|---|---|
| EP | 1835270 A1 | | 9/2007 | |
| EP | 4063634 A1 * | | 9/2022 | F01D 21/003 |
| JP | 06294687 A | | 10/1994 | |
| WO | WO-2020159723 A1 * | | 8/2020 | G01J 5/0014 |

\* cited by examiner

NON-CONTACT HIGH TEMPERATURE MEASUREMENT SYSTEM

BACKGROUND OF THE DISCLOSURE

1. Technical Field

This disclosure relates generally to a sensor system and, more particularly, to measuring temperature within, for example, a turbine engine.

2. Background Information

A turbine engine includes various sensors for measuring operating parameters of the turbine engine. For example, temperature sensors are included to measure temperatures at certain locations within the turbine engine. Various types and configurations of temperature sensors are known in the art. While these known temperature sensors have various benefits, there is still room in the art for improvement.

SUMMARY OF THE DISCLOSURE

According to an aspect of the present disclosure, an assembly is provided for a turbine engine. This turbine engine assembly includes a turbine engine structure and a sensor system. The sensor system includes a probe and an optical sensor. The probe is connected to the turbine engine structure. The probe projects into a gas path of the turbine engine. The sensor system is configured to measure a temperature of the probe using the optical sensor.

According to another aspect of the present disclosure, another assembly is provided for a turbine engine. This turbine engine assembly includes a turbine engine structure and a sensor system. The sensor system includes a probe and an optical sensor. The probe is connected to the turbine engine structure. The probe is in contact with gas within a gas path of the turbine engine. The sensor system is configured to determine a temperature of the gas based on temperature information for the probe detected by the optical sensor.

According to still another aspect of the present disclosure, a second system is provided that includes a probe, an optical sensor and a processing system. The probe includes a bore and an endwall. The bore extends within the probe from a first end of the probe to the endwall. The optical sensor is connected to the probe at the first end of the probe. The optical sensor has a line-of-sight down the bore to the endwall. The optical sensor is configured to detect temperature information indicative of a temperature of the endwall. The processing system is configured to determine a temperature based on the temperature information.

The temperature determined based on the temperature information may be a temperature of the probe.

The endwall may be configured to contact gas. The probe may provide a thermal break between the gas and the optical sensor. The temperature determined based on the temperature information may be a temperature of the gas.

The probe may project into the gas path from the turbine engine structure.

The optical sensor may have a line-of-sight through a bore of the probe to an endwall of the probe. The temperature information for the probe detected by the optical sensor may be indicative of a temperature of the endwall of the probe.

The turbine engine structure may be configured as or otherwise include a combustor wall.

The gas path may be configured as or otherwise include a combustion chamber. The probed may project into the combustion chamber from the turbine engine structure.

The probe may provide a thermal break between the gas path and the optical sensor.

The probe may project into the gas path to a distal end of the probe. The temperature of the probe measured by the sensor system may be a temperature of the distal end of the probe.

The probe may include a tubular sidewall and an endwall. The tubular sidewall may project into the gas path from the turbine engine structure to the endwall. The endwall may be connected to the tubular sidewall.

The optical sensor may have a line-of-sight through a bore of the tubular sidewall to the endwall. The optical sensor may be configured to detect electromagnetic radiation indicative of the temperature of the probe at the endwall.

The probe may be configured with a sealed cavity between the endwall and the optical sensor.

The optical sensor may be mounted to the probe outside of the gas path.

The optical sensor may include a fiber optic line and an optical receptor. The fiber optic line may be configured to transmit electromagnetic radiation data to the optical receptor. The optical receptor may be configured to provide sensor data based on the electromagnetic radiation data.

The assembly may also include a processing system configured to determine a temperature of gas within the gas path based on the temperature of the probe.

The sensor system may also include a second probe and a second optical sensor. The second probe may be connected to the turbine engine structure. The second probe may project into the gas path. The sensor system may also be configured to measure a temperature of the second probe using the second optical sensor.

The probe may be constructed from or otherwise includes an opaque material.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
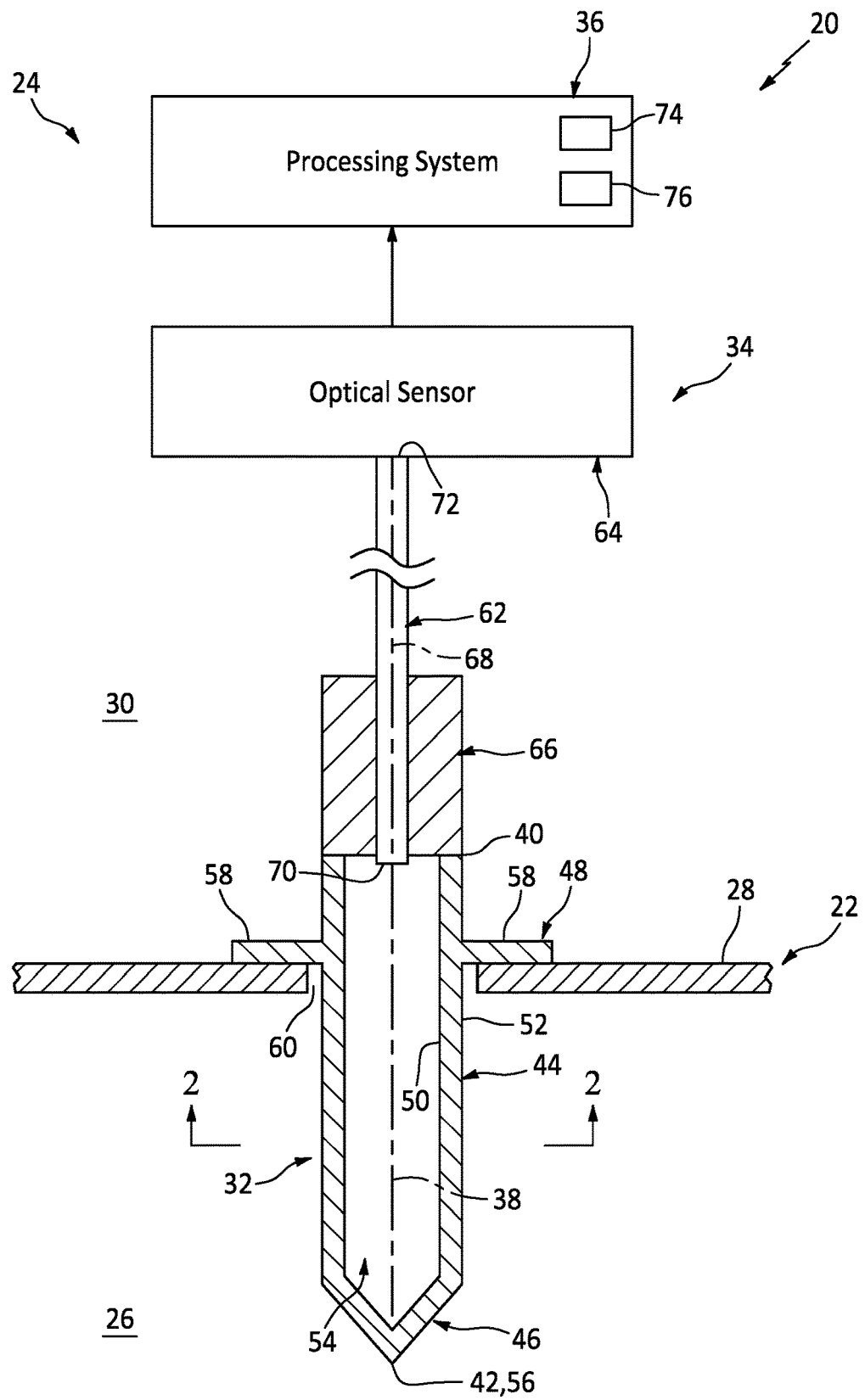
FIG. 1 is a partial side sectional illustration of an assembly for a turbine engine.

FIG. 1 illustrates an assembly 20 for a turbine engine. This turbine engine assembly 20 includes a turbine engine structure 22 and a sensor system 24.

The turbine engine structure 22 is configured to provide a peripheral boundary to a gas path 26 within the turbine engine. The turbine engine structure 22 of FIG. 1, for example, includes a wall 28 (e.g., a sidewall, an endwall, etc.) that fluidly separates the gas path 26 from another volume 30 (e.g., cavity, chamber, passage, etc.) within the turbine engine. For ease of description, the turbine engine structure 22 is described below as a combustor wall. The present disclosure, however, is not limited to such an exemplary turbine engine structure. For example, the turbine engine structure 22 may alternatively be configured as another wall (e.g., case, liner, etc.) within the turbine engine such as, but not limited to, a compressor wall, a diffuser wall, a turbine wall, an exhaust wall, a platform or a shroud. In another example, the turbine engine structure 22 may alternatively be configured as another component within the turbine engine such as, but not limited to, a vane (e.g., a stator vane, a guide vane, etc.) in a vane array structure.

The sensor system 24 is configured to determine a temperature within the turbine engine during turbine engine operation. The sensor system 24 of FIG. 1 includes a sensor probe 32, an optical (e.g., temperature) sensor 34 and a processing system 36.

The sensor probe 32 of FIG. 1 extends along a probe centerline 38 between and to a first (e.g., outer, exterior) end 40 of the sensor probe 32 and a distal second (e.g., inner, interior) end 42 of the sensor probe 32. This sensor probe 32 includes a (e.g., tubular) probe sidewall 44 and a probe endwall 46. The sensor probe 32 of FIG. 1 also includes a probe mount 48.

Figure 2:
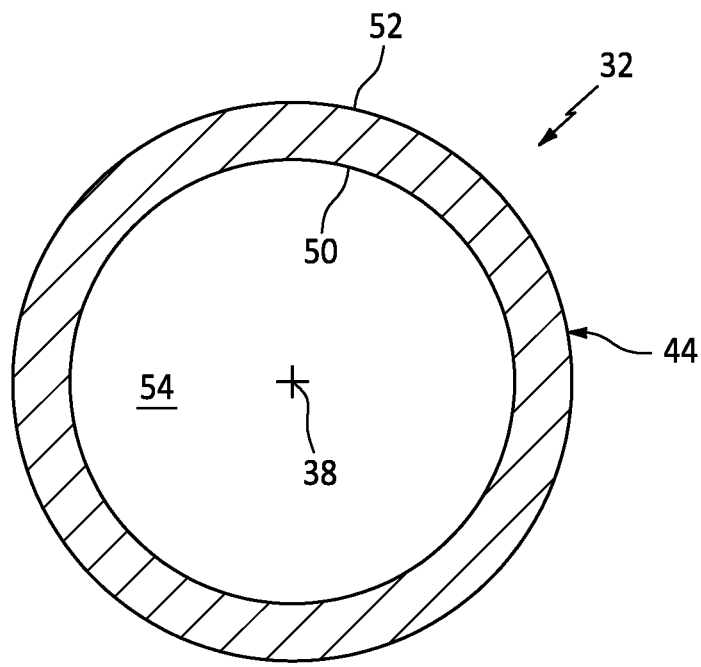
FIG. 2 is a cross-sectional illustration of a probe taken along line 2-2 in FIG. 1.

The probe sidewall 44 extends longitudinally along the probe centerline 38 from the probe first end 40 to the probe endwall 46. Referring to FIG. 2, the probe sidewall 44 extends circumferentially about (e.g., completely around) the probe centerline 38, thereby providing the probe sidewall 44 with a tubular body. The probe sidewall 44 extends laterally (e.g., radially relative to the probe centerline 38) between and to an interior surface 50 of the sensor probe 32 and an exterior surface 52 of the sensor probe 32. The probe interior surface 50 at least partially (or completely) forms an internal bore 54 within the sensor probe 32. The internal bore 54 of FIG. 1 projects longitudinally along the probe centerline 38 into the sensor probe 32 from the probe first end 40, along the probe sidewall 44 and its interior surface 50, to the probe endwall 46.

Figure 3:
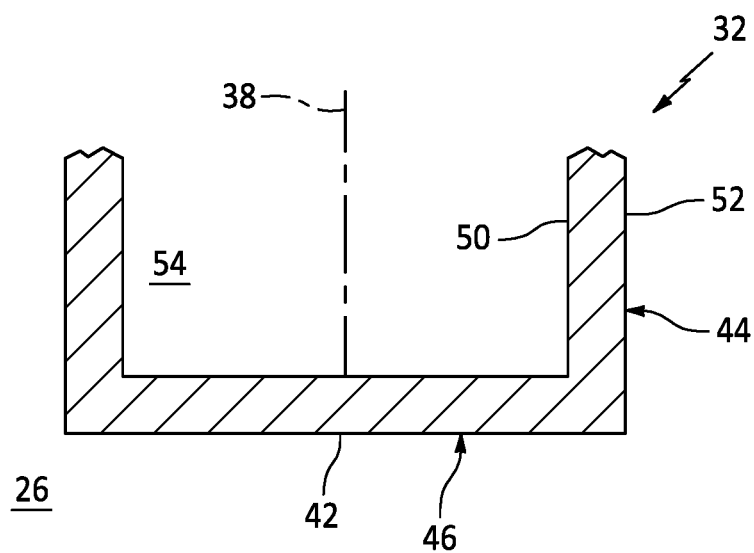
FIG. 3 is a side sectional illustration of a distal end of the probe with another endwall configuration.

The probe endwall 46 is arranged at (e.g., on, adjacent or proximate) the probe second end 42. The probe endwall 46 is connected to the probe sidewall 44. The probe endwall 46 is configured to cap off, cover, seal and/or otherwise close an end of the internal bore 54 at the probe second end 42. The probe endwall 46 may have an outwardly convex (e.g., conical, hemispherical, etc.) geometry; e.g., a V-shaped or U-shaped sectional geometry. The probe endwall 46 of FIG. 1, for example, laterally (e.g., radially) tapers as the probe endwall 46 extends longitudinally along the probe centerline 38 from the probe sidewall 44 to a (e.g., sharp or blunt) tip 56 of the sensor probe 32/the probe endwall 46 at the probe second end 42. The present disclosure, however, is not limited to such an exemplary endwall configuration. For example, referring to FIG. 3, the probe endwall 46 may alternatively have flat (e.g., disk, platelike, etc.) geometry; e.g., a straight sectional geometry.

The probe mount 48 of FIG. 1 is configured to mount the sensor probe 32 to the turbine engine structure 22. The probe mount 48 of FIG. 1, for example, includes one or more mounting flanges 58. Each of these mounting flanges 58 projects laterally (e.g., radially relative to the probe centerline 38) out from the probe sidewall 44 and its exterior surface 52 to a distal end of the respective flange 58. Each of the mounting flanges 58 is connected to and, for example, is cantilevered from the probe sidewall 44. The probe mount 48 of FIG. 1 is (e.g., slightly) longitudinally recessed from the probe first end 40.

The sensor probe 32 is arranged with the turbine engine structure 22. The sensor probe 32 of FIG. 1, for example, is mated with a probe aperture 60 (e.g., through-hole) in the turbine engine structure 22. An intermediate portion of the probe sidewall 44, for example, projects longitudinally along the probe centerline 38 through the turbine engine structure 22 and its wall 28. A first end portion of the probe sidewall 44 projects out from the turbine engine structure 22 into the volume 30 to the probe first end 40. A second end portion of the probe sidewall 44 projects out from the turbine engine structure 22 into the gas path 26 to the probe second end 42 and the probe endwall 46. The probe mount 48 of FIG. 1 is arranged in the volume 30, and is mounted (e.g., mechanically fastened, brazed, welded and/or otherwise attached) to the turbine engine structure 22. The sensor probe 32 may be secured to the turbine engine structure 22 in such a manner so as to cover, seal and/or otherwise close the probe aperture 60, which reduces or prevents leakage between the gas path 26 and the volume 30 on the other side of the turbine engine structure wall 28.

The sensor probe 32 is constructed from probe material. This probe material may be the same material from which the turbine engine structure 22 is constructed. Alternatively, the probe material may be different from the turbine engine structure material, but selected to operate in the same environment as the turbine engine structure 22. The probe material, for example, may be or otherwise include metal with a high melting point such as, but not limited to, tungsten (W), molybdenum (Mo), or an alloy including any one or more of the foregoing materials. The probe material may alternatively be or otherwise include a ceramic. Typically, the probe material is opaque.

The optical sensor 34 is configured outside of the gas path 26 and thereby is not exposed to, for example, a harsh environment of the gas path 26. The optical sensor 34 of FIG. 1 includes a fiber optic line 62 (e.g., a strand of fiber optics) and an optical receptor 64. The optical sensor 34 of FIG. 1 also includes a fiber optic connector 66.

The fiber optic line 62 extends along a longitudinal centerline 68 between a first end 70 of the fiber optic line 62 and a second end 72 of the fiber optic line 62. The fiber optic line 62 is configured with a (e.g., direct, straight) line-of-sight along the probe centerline 38 through the internal bore 54 to the probe endwall 46. The fiber optic line 62 of FIG. 1, for example, is connected to the sensor probe 32 by the fiber optic connector 66, where the line first end 70 faces into the internal bore 54 and towards the probe endwall 46. This fiber optic connector 66 of FIG. 1 connects a portion of the fiber optic line 62 at the line first end 70 to a portion of the sensor probe 32 at the probe first end 40. The fiber optic connector 66 may also cover, seal and/or otherwise close the internal bore 54. The sensor probe 32 may thereby include a sealed cavity between the probe endwall 46 and the fiber optic line 62, which provides a thermal break between the gas path 26 and the optical sensor 34.

The line second end 72 is connected to or otherwise optically coupled with the optical receptor 64. This optical receptor 64 is configured to receive optical information via electromagnetic radiation from the fiber optic line 62. The optical receptor 64 is further configured to provide sensor data generated from and/or indicative of the optical information. Various types and configurations of optical sensors are known in the art, and the present disclosure is not limited to any particular types or configurations thereof.

The processing system 36 is in signal communication with the optical receptor 64. The processing system 36, for example, may be hardwired and/or wirelessly coupled with the optical receptor 64.

The processing system 36 may be implemented with a combination of hardware and software. The hardware may include memory 74 and at least one processing device 76, which processing device 76 may include one or more single-core and/or multi-core processors. The hardware may also or alternatively include analog and/or digital circuitry other than that described above.

The memory 74 is configured to store software (e.g., program instructions) for execution by the processing device 76, which software execution may control and/or facilitate performance of one or more operations such as those described in the method below. The memory 74 may be a non-transitory computer readable medium. For example, the memory 74 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 4:
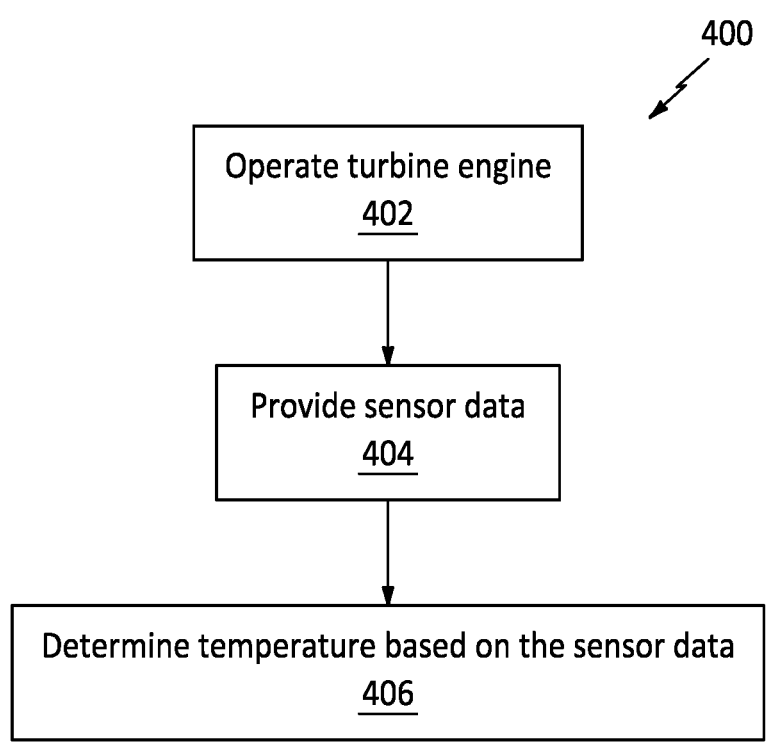
FIG. 4 is a flow diagram of a method for determining a temperature within a turbine engine.

FIG. 4 is a flow diagram of a method 400 for determining a temperature within the turbine engine. This method 400 is described below with reference to the sensor system 24 described above. The method 400 of the present disclosure, however, is not limited to using such an exemplary sensor system.

In step 402, the turbine engine is operated. During this turbine engine operation, gas (e.g., combustion products) flows within/through the gas path 26 (e.g., a combustion chamber) of FIG. 1. This flow of the gas may subject the turbine engine structure 22 (e.g., the combustor wall) as well as an end portion of the sensor probe 32 and its probe endwall 46 to relatively high temperatures. The gas contacting the probe endwall 46 may heat up the probe endwall 46 to an elevated temperature—a probe temperature. This probe temperature is related to a temperature of the gas flowing within/through the gas path 26—a gas temperature.

In step 404, the optical sensor 34 provides sensor data. Electromagnetic radiation (e.g., infrared (IR) light) emitted from the heated probe endwall 46 of FIG. 1, for example, may travel from the internal bore 54 to the fiber optic line 62 and its line first end 70. The fiber optic line 62 may communicate (e.g., propagate) the electromagnetic radiation (e.g., electromagnetic radiation data) from the internal bore 54 of the sensor probe 32 to the optical receptor 64, which optical receptor 64 may be located remotely from the turbine engine structure 22 and away from, for example, the harsh environment of the gas path 26. The optical receptor 64 may detect, capture and/or otherwise receive at least a portion or all of the electromagnetic radiation to obtain temperature information (e.g., temperature data) for the probe endwall 46. More particularly, the optical receptor 64 may convert or otherwise relate the received electromagnetic radiation into the temperature information, which temperature information is indicative of the probe temperature as well as the gas temperature. The temperature information (or other information based thereon) may be output as the sensor data.

In step 406, the processing system 36 determines a temperature within the turbine engine. The processing system 36 of FIG. 1, for example, receives the sensor data from the optical sensor 34. The processing system 36 may process this sensor data to determine the probe temperature. The probe temperature may then be used to determine the gas temperature, which may have a known correlation to the probe temperature. Alternatively, the processing system 36 of FIG. 1 may process the sensor data to determine the gas temperature without, for example, first determining the probe temperature. The method 400 and the sensor system 24 may thereby determine temperature information associated with the gas without exposing sensitive electronics directly to the gas.

Figure 5:
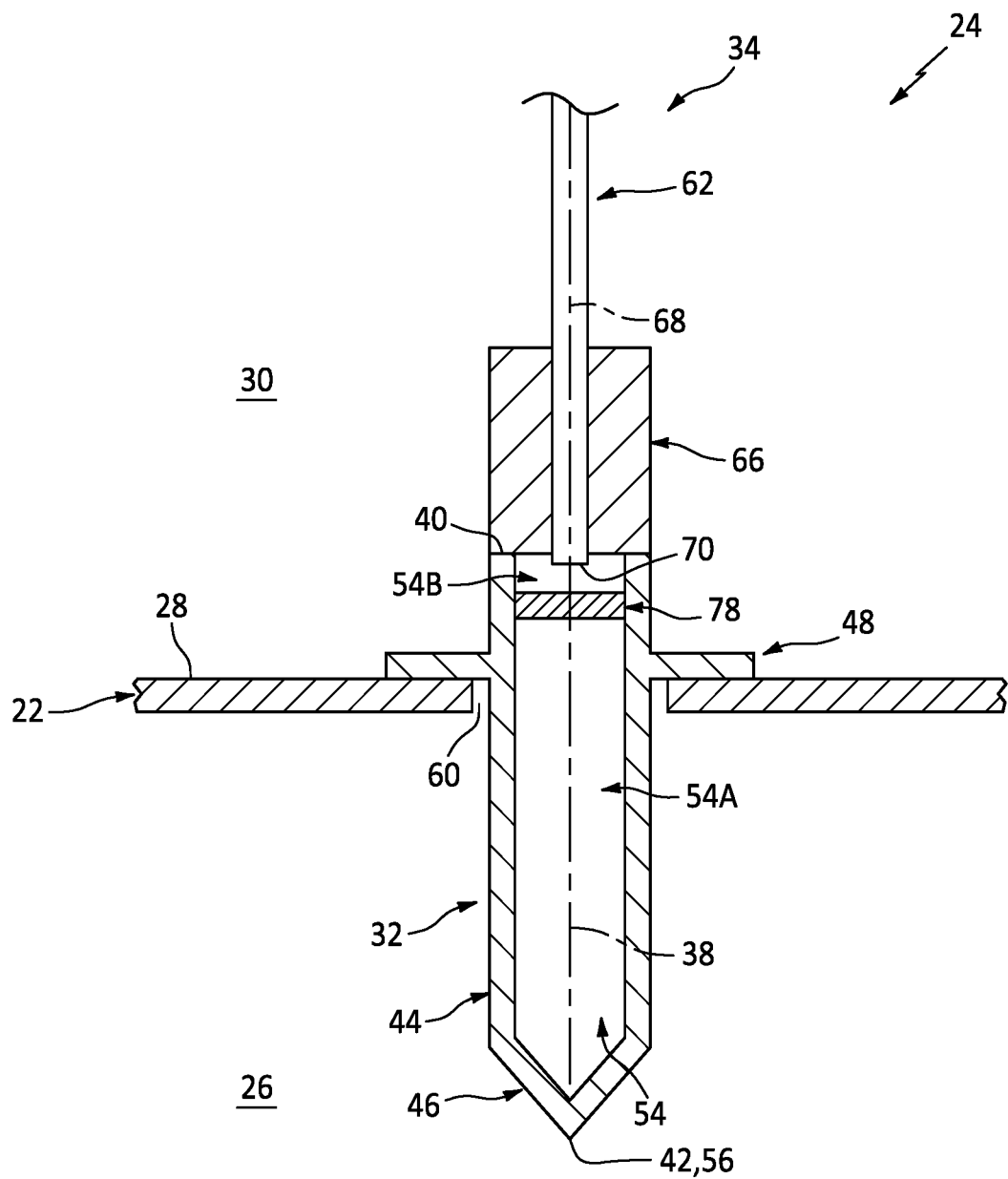
FIG. 5 is a partial side sectional illustration of the turbine engine assembly where the probe is configured with an internal transparent barrier.

In some embodiments, referring to FIG. 5, the sensor probe 32 may be configured with an internal electromagnetic radiation transparent barrier 78 (e.g., a lens, a window, etc.) between the probe endwall 46 and the fiber optic line 62. The transparent barrier 78 of FIG. 5, for example, is arranged within the internal bore 54. This transparent barrier 78 is constructed from or otherwise includes an electromagnetic radiation transparent material (e.g., glass) such that the electromagnetic radiation (e.g., infrared (IR) light) emitted from the probe endwall 46 may travel through the transparent barrier 78 to the line first end 70. However, the transparent barrier 78 may fluidly divide the internal bore 54 into a plurality of sealed internal cavities 54A and 54B. The transparent barrier 78 may thereby provide a failsafe barrier in case a portion of the sensor probe 32 (e.g., its sidewall 44 and/or its endwall 46) is damaged (e.g., fractured and/or otherwise corrupted) during turbine engine operation.

Figure 6:
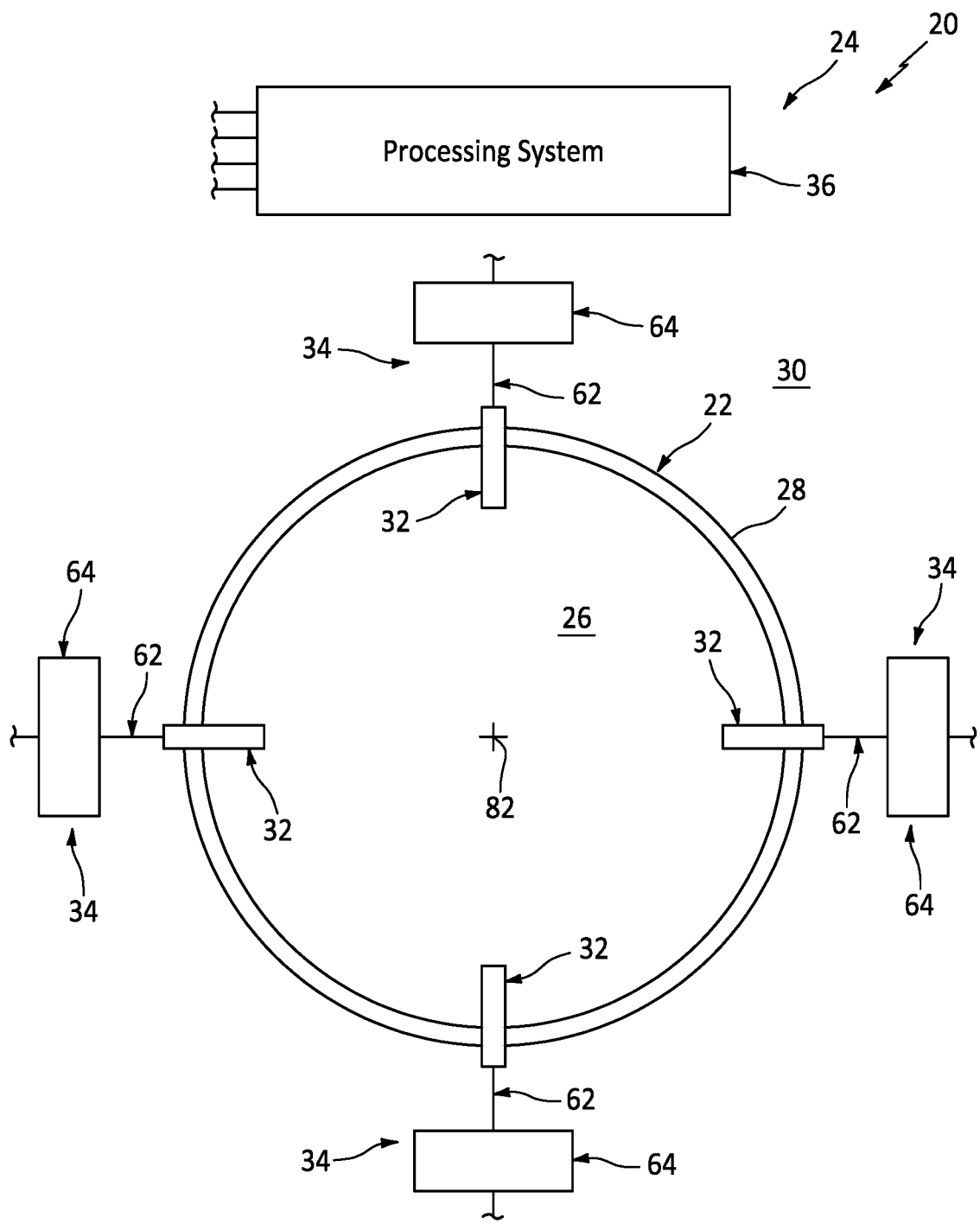
FIG. 6 is a schematic illustration of the turbine engine assembly configured with a plurality of the probes.

In some embodiments, referring to FIG. 6, the sensor system 24 may include a plurality of the sensor probes 32 and a plurality of corresponding optical sensors 34. The sensor probes 32 may be located at various locations longitudinally along and/or circumferentially about the turbine engine structure 22 and/or the gas path 26. Each of the sensor probes 32 of FIG. 6 is paired with a respective one of the optical sensors 34. Each of the optical sensors 34 is arranged in communication with the processing system 36. While the optical sensors 34 may be discrete units, two or more or all of these optical sensors 34 may alternatively be integrated into a single unit. With the arrangement of FIG. 6, the sensor system 24 may determine multiple temperatures (e.g., probe temperatures and/or gas temperatures) associated with the multiple sensor probe locations. This may be used to provide a temperature map for the turbine engine structure 22 and/or the gas. The sensor system 24 may also or alternatively process the sensor data from some or all of the optical sensors 34 to provide an average temperature for the turbine engine structure 22 and/or the gas therewith.

Figure 7:
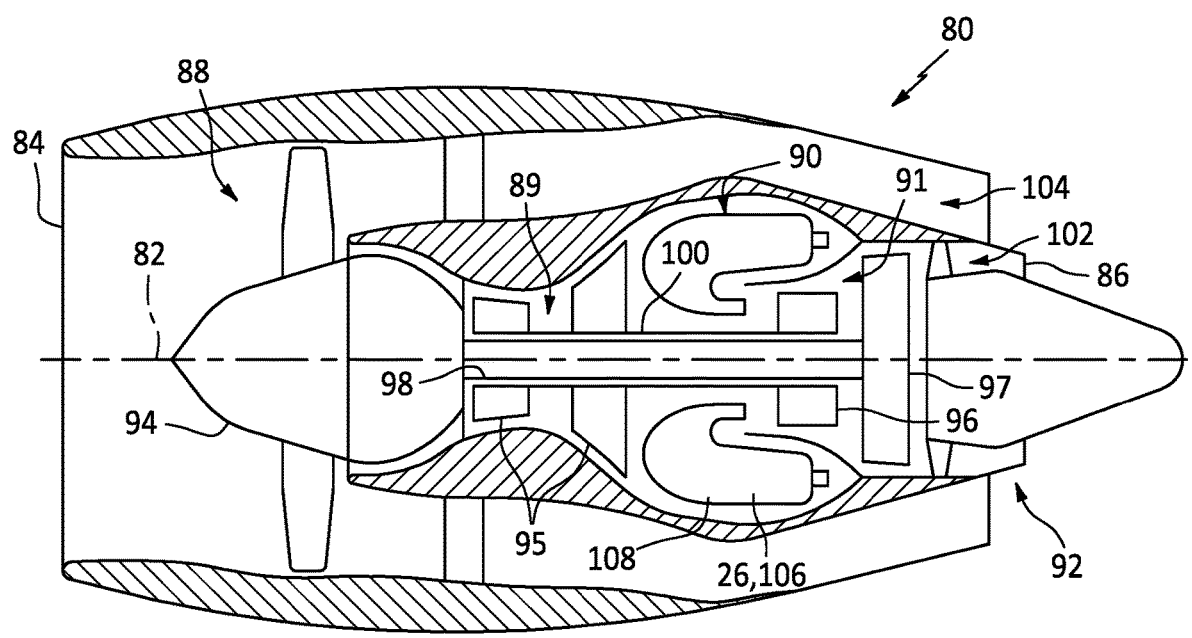
FIG. 7 is a side sectional illustration of the turbine engine.

FIG. 7 illustrates an example of the turbine engine with which the sensor system 24 may be configured. This turbine engine is configured as a turbofan gas turbine engine 80. This turbine engine 80 of FIG. 7 extends along a rotational axis 82 of the turbine engine 80 between an upstream airflow inlet 84 and a downstream airflow exhaust 86. The turbine engine 80 includes a fan section 88, a compressor section 89, a combustor section 90, a turbine section 91 and an exhaust section 92, where the turbine engine structure 22 may be configured as part of/included in any one of these turbine engine sections 88-92. Thus, the sensor system 24 may be configured to measure/monitor temperature within one of the turbine engine sections 88-92.

The fan section 88 includes a fan rotor 94. The compressor section 89 includes a compressor rotor 95. The turbine section 91 includes a high pressure turbine (HPT) rotor 96 and a low pressure turbine (LPT) rotor 97, where the LPT rotor 97 is configured as a power turbine rotor. Each of these rotors 94-97 includes a plurality of rotor blades arranged circumferentially around and connected to one or more respective rotor disks.

The fan rotor 94 is connected to the LPT rotor 97 through a low speed shaft 98. The compressor rotor 95 is connected to the HPT rotor 96 through a high speed shaft 100. The low speed shaft 98 extends through a bore of the high speed shaft 100 between the fan rotor 94 and the LPT rotor 97. The low speed shaft 98 and the high speed shaft 100 are rotatably supported by one or more bearings (not shown).

During operation, air enters the turbine engine 80 through the airflow inlet 84. This air is directed through the fan section 88 and into a core flowpath 102 and a bypass flowpath 104. The core flowpath 102 extends sequentially through the engine sections 89-92; e.g., an engine core. The air within the core flowpath 102 may be referred to as "core air". The bypass flowpath 104 extends through a bypass duct, which bypasses the engine core. The air within the bypass flowpath 104 may be referred to as "bypass air".

The core air is compressed by the compressor rotor 95 and directed into a combustion chamber 106 (e.g., the gas path 26) of a combustor 108 in the combustor section 90. Fuel is injected into the combustion chamber 106 and mixed with the compressed core air to provide a fuel-air mixture. This fuel-air mixture is ignited and combustion products thereof flow through and sequentially cause the HPT rotor 96 and the LPT rotor 97 to rotate. The rotation of the HPT rotor 96 drives rotation of the compressor rotor 95 and, thus, compression of air received from an inlet into the core flowpath 102. The rotation of the LPT rotor 97 drives rotation of the fan rotor 94, which propels bypass air through and out of the bypass flowpath 104. The propulsion of the bypass air may account for a significant portion (e.g., a majority) of thrust generated by the turbine engine 80.

The sensor system 24 of FIG. 1 may be included in various turbine engines other than the ones described above. The sensor system 24, for example, may be included in a geared turbine engine where a gear train connects one or more shafts to one or more rotors in a fan section, a compressor section and/or any other engine section. Alternatively, the sensor system 24 may be included in a turbine engine configured without a gear train; e.g., a direct drive turbine engine. The sensor system 24 may be included in a geared or non-geared turbine engine configured with a single spool, with two spools (e.g., see FIG. 7), or with more than two spools. The turbine engine may be configured as a turbofan engine, a turbojet engine, a turboprop engine, a turboshaft engine, a propfan engine, a pusher fan engine, an auxiliary power unit (APU) or any other type of turbine engine. The present disclosure therefore is not limited to any particular types or configurations of turbine engines. In addition, while the turbine engine is described above for use in an aircraft application, the present disclosure is not limited to such aircraft applications. For example, the turbine engine may alternatively be configured as an industrial gas turbine engine, for example, for a land based power plant.

The sensor system 24 is described above as measuring/monitoring temperature(s) within a turbine engine. The present disclosure, however, is not limited to turbine engine applications. For example, the sensor system 24 may be utilized for various other non-turbine engine applications where a thermal break between an environment/an apparatus being observed and electronic observation equipment would be useful.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
a turbine engine structure; and
a sensor system including a probe and an optical sensor;
the probe connected to the turbine engine structure and projecting into a gas path of the turbine engine, the probe including a tubular sidewall and an endwall, the tubular sidewall projecting into the gas path from the turbine engine structure to the endwall, the endwall connected to the tubular sidewall, and the endwall comprising an opaque material; and
the sensor system configured to measure a temperature of the opaque material using the optical sensor;
wherein the optical sensor has a straight line-of-sight from the optical sensor to the opaque material.

2. The assembly of claim 1, wherein the turbine engine structure comprises a combustor wall.

3. The assembly of claim 1, wherein
the gas path comprises a combustion chamber; and
the probe projects into the combustion chamber from the turbine engine structure.

4. The assembly of claim 1, wherein the probe provides a thermal break between the gas path and the optical sensor.

5. The assembly of claim 1, wherein
the probe projects into the gas path to a distal end of the probe; and
the temperature of the probe measured by the sensor system is a temperature of the distal end of the probe.

6. The assembly of claim 1, wherein the straight line-of-sight is through a bore of the tubular sidewall to the opaque material of the endwall, and the optical sensor is configured to detect electromagnetic radiation indicative of the temperature of the probe at the endwall.

7. The assembly of claim 6, wherein the probe is configured with a sealed cavity between the endwall and the optical sensor.

8. The assembly of claim 6, wherein the probe includes a probe centerline extending along the tubular sidewall between a first end and the endwall, and the tubular sidewall has a bore that is straight along the probe centerline between the first end and the endwall.

9. The assembly of claim 1, wherein the optical sensor is mounted to the probe outside of the gas path.

10. The assembly of claim 1, wherein
the optical sensor comprises a fiber optic line and an optical receptor;
the fiber optic line is configured to transmit electromagnetic radiation data to the optical receptor; and
the optical receptor is configured to provide sensor data based on the electromagnetic radiation data.

11. The assembly of claim 1, further comprising a processing system configured to determine a temperature of gas within the gas path based on the temperature of the probe.

12. The assembly of claim 1, wherein
the sensor system further includes a second probe and a second optical sensor;
the second probe is connected to the turbine engine structure and projects into the gas path; and
the sensor system is further configured to measure a temperature of the second probe using the second optical sensor.

13. An assembly for a turbine engine, comprising:
a turbine engine structure; and
a sensor system including a probe and an optical sensor, the probe connected to the turbine engine structure and in contact with gas within a gas path of the turbine engine, and the sensor system configured to determine a temperature of the gas based on temperature information for the probe detected by the optical sensor;
wherein the optical sensor has a straight line-of-sight through a bore of the probe to an opaque material forming an endwall of the probe, and the temperature information for the probe detected by the optical sensor is indicative of a temperature of the opaque material at the endwall of the probe.

14. The assembly of claim 13, wherein the probe projects into the gas path from the turbine engine structure.

15. The assembly of claim 13, wherein the probe includes a probe centerline extending between a first end and the endwall, and the probe has a straight bore between the first end and the endwall along the probe centerline.

16. A sensor system for a turbine engine, comprising:
a turbine engine structure forming a peripheral boundary of a gas path within the turbine engine;
a probe including a bore and an endwall, the bore extending within the probe from a first end of the probe to the endwall, and the probe connected to the turbine engine structure and in contact with gas within the gas path;
an optical sensor connected to the probe at the first end of the probe, the optical sensor with a line-of-sight straight down the bore to an opaque material forming the endwall, and the optical sensor configured to detect temperature information indicative of a temperature of the opaque material at the endwall; and
a processing system configured to determine a temperature based on the temperature information.

17. The sensor system of claim 16, wherein the temperature determined based on the temperature information is a temperature of the probe.

18. The sensor system of claim 16, wherein
the endwall is configured to contact gas;
the probe provides a thermal break between the gas and the optical sensor; and
the temperature determined based on the temperature information is a temperature of the gas.

19. The sensor system of claim 16, wherein the probe includes a probe centerline, and the bore is straight along the probe centerline.

20. The sensor system of claim 16, wherein the bore includes an interior surface defining a sealed cavity, and
wherein the line-of-sight straight down the bore is within the sealed cavity such that the line-of-sight is direct to the endwall.

* * * * *